United States Patent
Rothenhöfer et al.

(10) Patent No.: US 6,687,258 B1
(45) Date of Patent: Feb. 3, 2004

(54) TELECOMMUNICATIONS SYSTEM WITH A SWITCHING FACILITY AND A DATA CONCENTRATOR FOR PROVIDING ACCESS TO THE INTERNET

(75) Inventors: Karl Rothenhöfer, Leonberg (DE); Günther König, Korntal (DE); Helmut Kulzer, Ditzingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/385,626

(22) Filed: Aug. 27, 1999

(30) Foreign Application Priority Data

Sep. 4, 1998 (DE) .......................................... 198 40 329

(51) Int. Cl.⁷ ................................................. H04J 3/17
(52) U.S. Cl. ........................ 370/434; 370/352; 370/271; 379/88.17; 379/334
(58) Field of Search ................................. 370/217, 384, 370/259, 401, 237, 352–356, 408, 395.1, 389, 386, 399, 463, 524, 535–538, 271, 434; 379/93.09, 201.01, 88.17, 333, 334

(56) References Cited

U.S. PATENT DOCUMENTS

| | | | |
|---|---|---|---|
| 4,970,723 A | 11/1990 | Lin | 370/359 |
| 4,996,685 A * | 2/1991 | Farese et al. | 370/352 |
| 5,748,628 A * | 5/1998 | Ericson et al. | 370/384 |
| 5,999,609 A * | 12/1999 | Nishimura | 379/201 |
| 6,035,020 A * | 3/2000 | Weinstein et al. | 379/93.09 |
| 6,055,224 A * | 4/2000 | King | 370/217 |
| 6,349,096 B1 * | 2/2002 | Liu et al. | 370/352 |

FOREIGN PATENT DOCUMENTS

| | | |
|---|---|---|
| DE | 42 28 583 A1 | 11/1993 |
| DE | 197 28 878 A1 | 1/1998 |
| DE | 198 17 316 A1 | 10/1998 |
| DE | 197 45 961 A1 | 4/1999 |
| WO | WO 98/42107 | 9/1998 |

* cited by examiner

*Primary Examiner*—John Pezzlo
(74) *Attorney, Agent, or Firm*—Sughrue Mion, PLLC

(57) ABSTRACT

A method of operating a telecommunications system with a switching facility and with subscriber channels over which digital data are transmissible in the form of data packets each including a destination address, and such a telecommunications system are characterized in that the data packets of two or more subscriber channels to be sent to the Internet are combined onto a single concentrating channel.

3 Claims, 1 Drawing Sheet

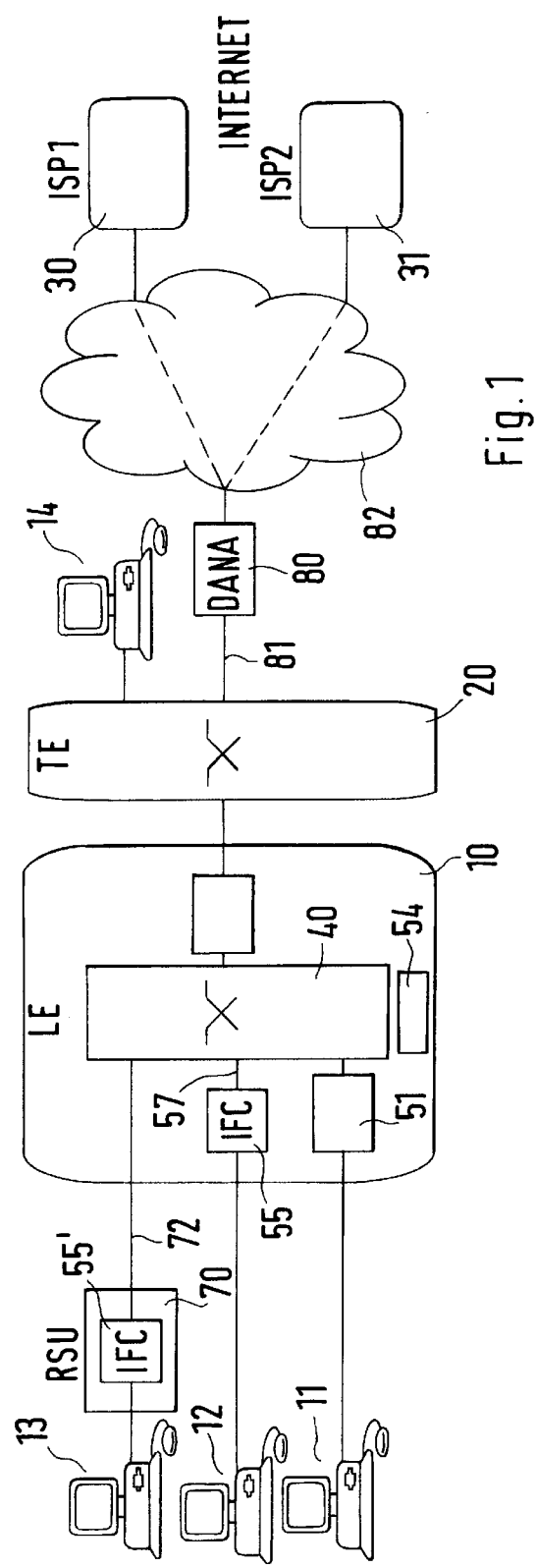
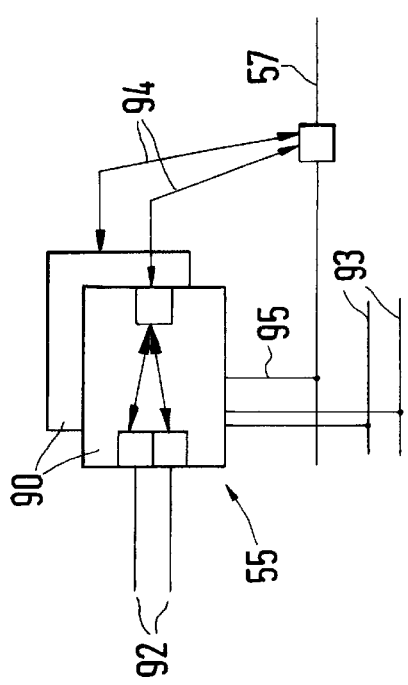
Fig. 1
Fig. 2

TELECOMMUNICATIONS SYSTEM WITH A SWITCHING FACILITY AND A DATA CONCENTRATOR FOR PROVIDING ACCESS TO THE INTERNET

BACKROUND OF THE INVENTION

This invention relates to a method of operating a telecommunications system comprising a switching facility and subscriber channels over which data are transmissible in packet form.

Such a telecommunications system is, for example, an ISDN system, which transmits both voice and data in digital form from one subscriber over 64-kb/s channels, called "B channels", to another subscriber.

The invention is applicable to the transmission of data of the subscriber if these data are offered in packet form, i.e., as a sequence of packets, on the subscriber's access channel (B channel). As is well known, these packets include destination address information of a general kind (i.e., not necessarily the telephone number of the desired subscriber).

The invention is applicable to voice transmission if the subscriber terminal itself converts voice information into packet form, as is done for voice transmission over the Internet.

Prior-art telecommunications systems with a switching facility are normally dimensioned so that not all subscribers can establish a call to the switching facility and to other subscribers at the same time, but the capacity of the switching facility in terms of channels that can be switched simultaneously is less than the number of subscribers connected. During data transmission, particularly if the duration of the respective data call is long compared to the duration of usual telephone calls, this may result in access to the switching facility being temporarily impossible because all channels leading to the switching network of the switching facility or all outgoing channels are busy.

SUMMARY OF THE INVENTION

The invention has for its object to provide a possibility of diminishing this disadvantage.

This and other objects are achieved by a method of operating a telecommunications system, which includes a switching facility and a plurality of subscriber channels over which data are transmitted in packet form, wherein calls from subscribers to an internet are recognized, and wherein, at the front end of the switching facility associated with the subscribers, those packets of the plurality of subscriber channels that are to be sent to the internet are combined onto a single channel.

Accordingly, the access channels (B channels) of two or more subscribers establishing a call to the same destination unit, for example to an Internet service provider, are no longer switched individually and separately up to the destination unit, but the packets transmitted on these channels are received already in the line circuit area of the switching facility by a concentrator and transmitted over one or a small number of outgoing channels to the destination unit.

An important advantage accrues from the fact that the packets of two or more subscribers are switched through in the switching facility by a single switching path, in contrast to the prior-art method where during data transmission a separate switching path was needed for the B channel of each subscriber, as is also the case for the through-switching of telephone calls.

The invention also provides a telecommunications system having subscriber channels over which data are transmitted in packet form, and a switching facility having crosspoints, wherein each crosspoint is capable of switching one of the subscriber channels to an outgoing channel. Further, at least one concentrator is provided, which combines packets of two or more subscriber channels that are to be sent to the internet onto at least one concentrating channel that leads to the switching facility. Therein, the concentrator is switched via a switching path and the number of concentrating channels is less than the number of subscriber channels.

According to another formulation of the claimed invention, a concentrator is provided, which has at least one device for concentrating data incoming on two or more B channels in a single, outgoing channel.

If the invention is implemented in an ISDN switching facility, where each subscriber channel has a capacity of 64 kb/s, in one embodiment of the invention the packets of different subscribers are transferred into a transmission buffer according to their temporal arrival at the concentrator, and subsequently transmitted in mixed form and in close succession on the transmission channel of likewise 64 kb/s to the common destination unit. This channel then requires essentially only that technical equipment in the switching facility necessary for a single telephone call, referred to in the following as a single switching path.

How many subscriber channels can be concentrated in one outgoing channel depends on the type of the application and the resulting average data volume per subscriber channel and unit of time. In this respect, the invention can be dimensioned very differently.

In the case of Internet access, empirical values show that on an average, a subscriber uses only about 10–15 percent of the maximum transmission capacity of 65 kb/s over the total call duration. Accordingly, the packets of eight subscriber channels, for example, could be combined at the concentrator onto one channel to the destination unit. To be able to handle short-time peak traffic, however, the concentration factor will have to be only about 3:1 if only a single outgoing channel is present.

Therefore, to increase the efficiency of the concentrator, instead of switching only one transmission channel to the destination unit, each concentrator switches a small group of such channels, over which the packets of 16 active subscriber channels, for example, are then transmitted simultaneously. This suffices to provide access to the concentrator for 64 ISDN subscribers.

An important feature of one embodiment of the invention is that in such a major ISDN line circuit area, which typically consists of eight line modules each having eight ISDN basic-access arrangements with two B channels each (i.e., a total of 128 B channels), the concentrator is dispersed over all (up to eight) modules involved, which contain one control computer each. The purpose of the arrangement is that access can be gained from any of the line modules to any of the established concentrating channels to the destination unit. Prior to each transmission of a packet, a fast access logic in the hardware of each module detects traffic pauses in the individual concentrating channels, and the packet is then transmitted over a currently idle concentrating channel. Contention is resolved quickly by the access logics of all affected line modules agreeing automatically on a uniform channel allocation. It is also possible to use other known methods of resolving such conflicts.

In a simple embodiment of the invention, prior to the beginning of its use, each of the concentrating channels between the concentrator and the destination unit is switched through the switching facility as a semi-permanent connection, and is then available to the concentrator for an essentially unlimited period of time.

In a more sophisticated embodiment of the invention, the number of concentrating channels can be automatically increased or reduced from the concentrator depending on the traffic volume, with the method used in the switching facility for switching these channels being the same as that used for switching voice channels. According to another feature of the invention, if required, two or more destination units are reachable from a concentrator; then at least one concentrating channel has to be switched to each destination unit. In that case, the concentrator, when transmitting the packets, sees to it that according to the address information contained in the header of each packet, only those concentrating channels that lead to the addressed destination unit are used for the transmission of this packet.

The determination that access to the Internet is desired is derived from the dialling information entered by the subscriber. This may be, for example, the telephone number of a service provider, a group of digits in the telephone number assigned to two or more service providers, or a special prefix.

So far, only those data were considered that are sent from a subscriber toward, e.g., the Internet. However, the various parts of the switching facility and the concentrator are advantageously designed to also supply data flowing in the opposite direction to the respective subscriber, as is also the case if each subscriber is assigned a separate subscriber channel for data transmission in the conventional manner.

Further features and advantages of the invention will become apparent from the following description of embodiments of the invention taken in conjunction with the accompanying drawing, which shows details essential for the invention, and from the claims. The individual features may be implemented alone or in arbitrary combinations.

BRIEF DESCRIPTION OF THE DRAWINGS

In the drawing:

FIG. 1 is a schematic representation of a telecommunications system in accordance with the invention; and FIG. 2 is a schematic representation of concentrator.

DETAILED DESCRIPTION OF THE INVENTION

FIG. 1 shows schematically an ISDN system comprising a local switching facility 10 (local exchange, LE), to which a plurality of subscribers are connected. These subscribers are symbolized by four subscriber terminals 11, 12, 13, and 14, which are shown as computers. The switching facility 10 is connected to a national switching network 20 (TE). In this example, the access point to service providers 30 and 31 (ISP1 and ISP2, Internet service providers), which provide access to a multicomputer system, in this example to the Internet, is distant from the switching facility 10. Therefore, this access point is connected to the switching facility 10 not directly, but via the switching network 20.

The telecommunications network shown is an ISDN that uses the protocol DSS1 (Digital Subscriber Signalling System No. 1) for the communication between the subscribers and the local switching facility 10 and the signalling protocol no. 7 (SSN7) for the communication between switching facilities. Signalling between the subscribers and their associated switching facility takes place via the D channel.

Telephone calls or digital user data are transmitted over a 64-kb/s B channel. The data are transmitted in the form of packets which include and are identifiable by some kind of destination address. In general, each subscriber is assigned two B channels. The invention also allows the simultaneous connection of both B channels to the concentrator.

The local switching facility 10 and the switching facilities in the national switching network 20 contain digital switching matrices 40 (shown only in the switching facility 10) via which the bidirectional digital 64-kb/s channels can be switched dynamically or semipermanently.

Via the ISDN terminal 11, a telephone conversation is being conducted with the subscriber 14 at the national network. Before the start of the conversation, the subscriber at terminal 11 removed the handset and dialled the number of subscriber 14. The connection request and the dialling information were communicated to the switching facility through the ISDN D channel, and the switching facility switched a B channel of the terminal from the input circuit 51 in the line circuit area of the local switching facility through the switching network 40, from where this B channel was switched through the telecommunications network to the called subscriber 14 in the known manner.

The subscriber 12 is an ISDN subscriber that is connected to a subscriber line module of the local switching facility 10 and operates a terminal that can send and receive data in packet form and a protocol suitable for Internet communication.

At the beginning of the call, the switching facility 10 is notified by the terminal 12 over the D channel that a connection is to be established to the service provider 30 (ISP1), and that the data to be transmitted will be packet data. A monitoring unit 54 in the switching facility 10 additionally recognizes from the connection setup information that for this connection, a concentration of the packet data to be transmitted is possible up to a destination unit (data application network adapter, DANA) located between the national network 20 and the service provider 30 (ISP1), and that the call-charge advantage associated therewith is desired by the subscriber.

The switching facility 10 then does not route the B channel of the terminal 12 as a separate 64-kb/s channel to the ISP1 as usual, but switches it onto a concentrator 55 (IFC, Internet Frame Concentrator) in the line circuit area of this subscriber 12. Before that, the concentrator 55 was connected via one or more (a group of) concentrating channels 57 to the destination unit 80 (DANA), for example by semipermanent switching of these channels.

The concentrator 55 now combines all packets received from the subscriber 12 to the destination unit 80 onto the one or more concentrating channels (64 kb/s). The concentrating effect results from the fact that all ISDN subscribers (8 to 64) of an exchange area have access to one concentrator 55, which typically consists of up to eight identical ISDN line modules. The connection to the concentrator 55 is effected whenever the subscriber selects the IFC service by dialling a corresponding number and if a maximum number of B channels already switched to the concentrator has not yet been exceeded. This maximum number depends on the number of concentrating channels switched to the destination unit 80 and can be set, for example, to the value 16 if four concentrating channels are present.

Compared with the direct switching of 16 B channels to the ISP1, this provides a saving in the ISDN network of 12 channels. Such a saving can be achieved for every further exchange area of 64 subscribers, and allows a network operator to switch, in addition to the normal telephone traffic, a considerable percentage of ISDN subscribers to such Internet service providers without having to correspondingly increase his network capacity and transmission line capacity.

The subscriber 13, unlike the subscriber 12, is an ISDN subscriber connected to a remote subscriber unit (RSU) of the local switching facility 10. This remote subscriber unit contains a concentrator 55' virtually identical to 55, but is connected to the switching facility 10 via a many-kilometer-long 2-Mb/s trunk that carries, besides a signalling channel and a general control channel, up to 30 64-kb/s bearer channels. Part of these 30 bearer channels (4 in this example) are switched as concentrating channels between IFC' and target unit 80 through the switching networks of the switching facilities 10 and 20. In the remote unit RSU, typically up to 64 ISDN subscribers have access to a concentrator unit 55' (IFC). Since an RSU generally consists of a substantially larger group of ISDN lines (e.g., 256), it may contain a corresponding number (e.g., 4) of concentrator units IFC, and a corresponding number of 2-Mb/s trunks to the local switching unit 10 may be provided. Since with this remote configuration the essential bottleneck lies in the limited transmission capacity of the trunk between the RSU and the switching unit 10, the invention is of particular importance there because of its concentrating effect.

Without the invention, for the additional data traffic with unchanged telephone traffic, either more trunks would have to be laid over the long distance or the number of subscribers connected to an RSU would have to be substantially reduced, so that the lack of trunk channels would not lead to prohibitively high blocking values during the establishment of telephone and data calls. Compared with the provision of a packet data concentrator in accordance with the invention, both measures would be very expensive for the operator of the telecommunications network.

In both cases, i.e., in the case of a local ISDN connection and a connection via an RSU, the concentrating channels reach the destination units 80 (DANA) on the remote side of the ISDN network. The destination unit 80 can receive a great number of concentrating channels from the concentrator units IFC and IFC'. It recognizes the packets destined to the ISP1 by their address information, and routes them, if necessary through intermediate data networks, to the (ISP1). Via a suitably expanded destination unit 80 (as provided in the embodiment), two or more different service providers, in this example the service provider 31 (ISP2), can be reached. Then the packets for ISP1 and ISP2 are transmitted from each concentrator IFC over the concentrating channels to the destination unit 80 in mixed form, and distributed (routed) by the destination unit 80 to ISP1 and ISP2. The destination unit 80 (data application network adapter, DANA) is connected to the ISDN network via one or more 2-Mb/s trunks 81 (and ISDN primary-access arrangements) each carrying 30 64-kb/s bearer channels.

The concentrating channels pass through the switching facility 10 and the switching network 20 transparently; the latter may therefore contain switching equipment that need not be specifically adapted for the invention.

The concentrator 55 shown in FIG. 2 contains a number of modules 90, which each contain a computer. Each of the modules 90 receives 16 B channels 92 (8 ISDN basic-access channels) at its input end (left-hand end in FIG. 2); to simplify the illustration, only two B channels are shown. If a B channel 92 transports a telephone call, the module 90 is designed to route this B channel 92 to a B channel 93 leading to the switching network (40 in FIG. 1) unchanged. If data packets are to be concentrated, the concentrator 55 works as follows. All modules 90 that are to concentrate data monitor an outgoing channel 57, having a capacity like a B channel but intended for data concentration, as to whether data are being transmitted there. This monitoring is symbolized by lines 94. If no data are detected there, the first module to detect this sends a data packet of a B channel 92 to the channel 57 over a data line 95.

In another embodiment, instead of one channel 57, a group of such channels (up to 8) is reserved for this purpose and is monitored from and accessible to each of the up to 8 modules.

It is to be understood that the invention also extends to telecommunications networks that differ from the network described. In particular, it is possible to convert data packets transported on analog lines into digital data by a modem in the front end of the switching facility and to concentrate these digital data in accordance with the invention.

"Internet" as used herein means primarily the well-known worldwide computer communication network in which the data packets are transmitted in the asynchronous transfer mode (ATM) using the protocol TCP/IP. Other packet-switching networks with a uniform protocol can also be regarded as an internet in which the invention can be used.

What is claimed is:

1. A method of operating a telecommunications system having a switching facility and a plurality of subscriber channels over which data are transmitted in packet form, comprising:

recognizing calls from subscribers to an internet;

at the front end of the switching facility associated with said subscribers, combining those packets of the plurality of subscriber channels that are to be sent to the internet onto a single channel; and in a concentrator, concentrating data incoming on two or more B channels in a single, outgoing channel; wherein two or more devices of the concentrator together control the feeding of packets into at least one concentrating channel, particularly with a view to avoiding and controlling access contention.

2. The method as claimed in claim 1, wherein two or more concentrating channels are provided, and wherein packets of two or more subscribers are fed into the two or more concentrating channels without fixed assignment to the subscribers.

3. A method of operating a telecommunications system having a switching facility and a plurality of subscriber channels over which data are transmitted in packet form, comprising:

recognizing calls from subscribers to an internet;

at the front end of the switching facility associated with said subscribers, combining those packets of the plurality of subscriber channels that are to be sent to the internet onto a single channel; and in a concentrator, concentrating data incoming on two or more B channels in a single, outgoing channel, wherein the concentrator is configured to switch so as to route data not to be concentrated to associated outgoing B channels.

* * * * *